UNITED STATES PATENT OFFICE.

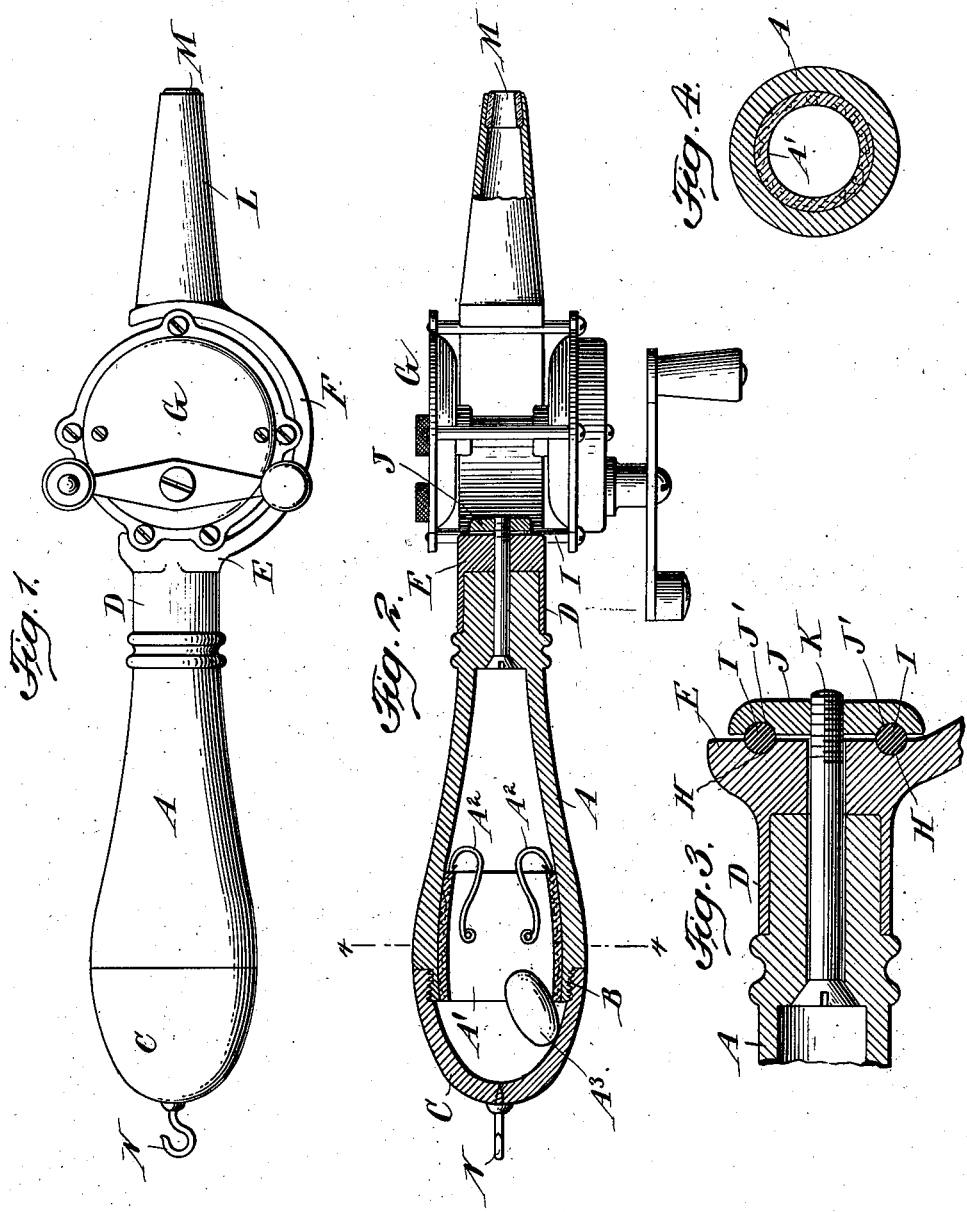

EDWARD R. GILLETTE, OF NEW YORK, N. Y.

FISHING APPLIANCE.

1,001,195. Specification of Letters Patent. Patented Aug. 22, 1911.

Application filed May 26, 1909, Serial No. 498,495. Renewed January 13, 1911. Serial No. 602,477.

*To all whom it may concern:*

Be it known that I, EDWARD R. GILLETTE, a citizen of the United States, residing in the city of New York, in the borough of Brooklyn, in the county of Kings and State of New York, have invented a certain new and useful Improvement in Fishing Appliances, of which the following is a specification.

The invention relates to means for carrying and controlling fishing lines, and has for its object to provide a device in the nature of a handle for removably supporting a reel containing the fishing line, which handle is hollow and may be used as receptacle for fish hooks, sinkers and the like.

Other objects of the invention will appear from the description hereinafter, and the features of novelty will be pointed out in the appended claims.

The accompanying drawings form a part of this specification and show an approved form of the invention.

Figure 1 is a side elevation of the improved appliance; Fig. 2 is a horizontal section thereof partly in plan view; Fig. 3 is an enlarged detail section showing the means for securing the reel in position; and Fig. 4 is a cross section on the line 4—4 in Fig. 2.

The device comprises a handle A which is preferably of hard wood, hollow and provided at one end with a screw threaded projection B arranged to receive a closing cap C. The opposite end of the handle is received in a sleeve D forming part of a casting E. The casting E is formed with a curved portion F adapted to extend partly around a reel G of any ordinary or approved type, so as partially to inclose the reel. Recesses or grooves H extending parallel with the axis of the reel G are located on the inner face of the curved portion F and are intended to receive the base-pillars I of the reel. A removable locking-plate J having grooves J¹ disposed oppositely to the grooves H is adapted to extend over the pillars I and is maintained in position by a screw K which passes through the handle A and casting E. The screw K is made readily accessible by simply unscrewing the cap C.

A tubular extension L projects from the curved portion F of the casting E substantially in axial alinement with the handle A. The free end of said extension L is provided with an eye M of agate or analogous material to permit the line to run freely therethrough, it being understood that the line passes from the reel through a suitable opening in the curved portion F to and through the said extension L.

The interior of the handle A is preferably lined with cork A¹ or similar material either entirely or on a portion of its surface, for the reception of fish hooks A² attached thereto by embedding the barbs therein. The hollow handle A may also be used as a receptacle for sinkers A³ and other fishing articles. A hook N is secured to the cap C for supporting the entire device either on the person of the user or otherwise, and allows both hands to be free when desired.

The invention provides a simple and efficient device for use in hand-line fishing and affords a ready means for casting with full control of the line. By simply loosening the screw K the reel may be removed and another substituted, so that it is possible to interchange reels easily and quickly when it is desired to do so. The device also prevents entanglement of the line and injury to the hands in landing a fish, an objectionable feature of ordinary hand-line fishing. By making the handle hollow a receptacle for hooks, sinkers, and other small articles, is provided so that the danger of loss or misplacement of such articles is lessened. The device further is compact and neat in appearance and is easily carried either in the pocket or suspended from a button or button-hole on the user's garment by means of the hook N.

Various modifications may be made without departing from the invention as defined in the claims.

I claim:—

1. A device of the character set forth, comprising a handle provided with transversely extending grooves, a reel having portions arranged to project into said grooves, and a removable plate adapted for engagement with said reel portions opposite said grooves for maintaining said reel in position.

2. A device of the character set forth, comprising a handle provided with transversely extending grooves, a reel having portions arranged to project into said grooves, and a removable plate adapted for engagement with said reel portions opposite said grooves, and means for securing said plate in operative position.

3. A device of the character set forth, comprising a reel, a handle having a recessed portion partially inclosing said reel, said recessed portion provided with transversely extending grooves arranged to receive pillars on said reel, a removable plate adapted for engagement with said pillars opposite said grooves for maintaining said reel in position, and an extension secured to said recessed portion and having an axial opening through which the fishing line passes.

4. In a device of the character set forth, a hollow handle having an open end and a closed end, a removable cap for closing said open end, a lining of spongy material as cork on the interior of said handle, and a reel removably supported on said handle adjacent to the closed end thereof.

In testimony that I claim the invention above set forth I affix my signature, in presence of two witnesses.

EDWARD R. GILLETTE.

Witnesses:
CHARLES R. SEARLE,
G. R. PATCHEN.